United States Patent [19]

Liubakka et al.

[11] Patent Number: 5,519,612
[45] Date of Patent: May 21, 1996

[54] ACTIVE SUSPENSION SYSTEM WITH ADAPTIVE ACTUATOR GAIN ADJUSTMENT

[75] Inventors: Michael K. Liubakka, Livonia; James R. Winkelman, Bloomfield, both of Mich.

[73] Assignee: Ford Motor Company, Dearborn, Mich.

[21] Appl. No.: 990,389

[22] Filed: Dec. 14, 1992

Related U.S. Application Data

[63] Continuation-in-part of Ser. No. 720,102, Jun. 24, 1991, Pat. No. 5,235,512.

[51] Int. Cl.⁶ ................................................ B60K 11/00
[52] U.S. Cl. ................................. 364/424.05; 280/707
[58] Field of Search ............................ 180/9.1; 280/707, 280/709, 714, 840; 364/424.05, 424.01, 426.01; 188/282, 299

[56] References Cited

U.S. PATENT DOCUMENTS

| | | | |
|---|---|---|---|
| 4,579,366 | 4/1986 | Doi et al. | 280/707 |
| 4,634,142 | 1/1987 | Woods et al. | 280/707 |
| 4,648,622 | 3/1987 | Wada et al. | 280/707 |
| 4,765,648 | 8/1988 | Mander et al. | 280/707 |
| 4,771,848 | 9/1988 | Namba et al. | 180/197 |
| 4,803,637 | 2/1989 | Tada et al. | 364/426.04 |
| 4,819,172 | 4/1989 | Takeuchi et al. | 364/431.07 |
| 4,840,245 | 6/1989 | Kamei et al. | 180/179 |
| 4,870,583 | 9/1989 | Takahashi et al. | 364/426.04 |
| 4,893,243 | 1/1990 | Tada et al. | 364/426.04 |
| 4,898,257 | 2/1990 | Brandstadter | 180/9.1 |
| 4,934,731 | 6/1990 | Hiwatashi et al. | 280/696 |
| 5,020,781 | 6/1991 | Huang | 267/136 |
| 5,037,128 | 8/1991 | Okuyama et al. | 280/703 |
| 5,231,583 | 7/1993 | Lizell | 364/424.05 |

FOREIGN PATENT DOCUMENTS

| | | |
|---|---|---|
| 0220115 | 10/1986 | European Pat. Off. |
| 0314296 | 5/1989 | European Pat. Off. |
| 342757A1 | 9/1984 | Germany |
| 3715423A1 | 5/1987 | Germany |
| 62-289420 | 10/1987 | Japan |
| 2164765 | 3/1986 | United Kingdom |

OTHER PUBLICATIONS

J. t. Ball, "Approaches and Trends in Automatic Speed Controls," SAE Technical Paper No. 670195, 1967.
W. C. Follmer, "Electronic Speed Control," SAE Technical Paper No. 740022, 1974.
B. Chaudhuri et al., "Speed Control Intergated into the Powertrain Computer", SAE Technical Paper No. 860480, 1986.
T. Tabe et al., "Vehicle Speed Control System for Using Modern Control Theory," IEEE IECON '86 Proceedings, 1986.
M. Uriubara et al., "Development of Automotive Cruising Using Fuzzy Control Systems," Journal of SAE of Japan, vol. 42, No. 2, 1989.
T. Tsijii et al., "Application of Self–Tuning to Automotive Cruise Control," American Control Conference Proceeding, May, 1990.
M. Sunwoo et al. "Investigation of Adaptive Control Approaches For Vehicle Active Suspension Systems," American Control Conference, Jun. 26–28, 1991.

*Primary Examiner*—Gary Chin
*Assistant Examiner*—Stephen J. Walder, Jr.
*Attorney, Agent, or Firm*—Raymond L. Coppiellie; Roger L. May

[57] ABSTRACT

An active suspension system uses a closed-loop feedback controller to with tunable feedback gains to produce a control signal which minimizes a cost function formed by the weighted sum of system outputs including body acceleration and wheel displacement error. The feedback gains are adaptively varied by incremental amounts which are calculated based on the "pseudo-sensitivities" of those gains to system outputs, the pseudo-sensitivities being generated by a fixed-gain model of the suspension system and being combined using weighting factors which insure convergence in accordance with the predetermined cost function. The adaptive control provides long-term compensation for varying road conditions, variations from vehicle-to-vehicle, and changes in vehicle performance.

2 Claims, 5 Drawing Sheets

ACTIVE SUSPENSION SYSTEM WITH ADAPTIVE ACTUATOR GAIN ADJUSTMENT

CROSS-REFERENCE TO A RELATED APPLICATION

This application is a continuation-in-part of U.S. patent application Ser. No. 07/720,102 entitled "Self-Tuning Speed Control for a Vehicle" filed Jun. 24, 1991 now U.S. Pat. No. 5,235,512.

FIELD OF THE INVENTION

This invention relates to vehicle suspension systems for movably mounting wheels on a vehicle body in optimum ways to enhance passenger comfort and improve the vehicle's handling characteristics.

SUMMARY OF THE INVENTION

The present invention takes the form of an adaptive, active suspension system in which powered actuators are used to apply forces between a vehicle's body and wheels, the magnitude of the forces being computed in accordance with optimization routines which are themselves altered in response to changing driving conditions.

In accordance with the invention, computational methods are employed to alter control variables which determine the dynamic characteristics of the suspension system, the variables being modified in response to changing conditions to control the dynamic characteristics of the suspension system while maintaining a desired relationship between the amount of acceleration experienced by the vehicle body, the displacement from equilibrium which occurs between the wheel and the vehicle body, and the amount of power delivered to the active suspension actuator.

In the preferred embodiment of the invention to be disclosed, the control gains used to control the amount of acceleration and position error feedback are adaptively varied to compensate for changing road conditions, variations from vehicle to vehicle, and changes in the performance of the suspension system over time. The control gains are adaptively altered in increments, the values being calculated based on "pseudo-sensitivities" which are produced by a fixed gain model of the suspension system and which indicate the rate at which system outputs change with incremental changes in the value of the feedback gains to be modified. In accordance with the invention, the incremental gain changes are calculated from a combination of pseudo-sensitivity values which are assigned weights selected to achieve a predetermined relationship between system output values.

These and other features and advantages of the present invention may be better understood by considering the following detailed description of a specific embodiment of the invention. In the course of this description, reference will frequently be made to the attached drawings.

DESCRIPTION OF THE PREFERRED EMBODIMENT

Figure 1:
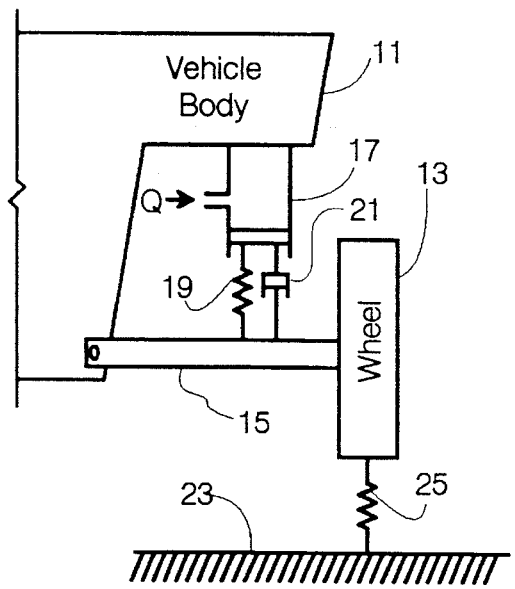
FIG. 1 is a pictorial diagram of a quarter-car model of an active suspension system of the type which may be controlled using the principles of the present invention.

The goal of active vehicle ride control is to improve passenger comfort and handling over a variety of road surfaces. For the simplest analysis, the vehicle can be viewed as a quarter car moving only in the vertical direction. This results in a vehicle model of the form shown in FIG. 1, in which the mass of the vehicle's body is represented by the sprung mass 11. The wheel, represented by the unsprung mass 13, is attached to the body 11 by a control arm 15. The body 11 is supported above the unsprung wheel mass 13 by an active suspension system composed of an actuator which consists of the control arm 15, a spring 19, a damper 21, and a volume of fluid 17 which acts in series with a spring 19 and a damper 21. By pumping a fluid flow Q in or out of the actuator 17, the suspension forces and ride heights can be controlled. The wheel's unsprung mass 13 is supported by the road surface 23, the tire deflection being represented in the model of FIG. 1 by the spring 25. The invention to be described may also be used with other active suspension actuators, such as a force generator in parallel with a spring and damper.

A passive suspension model includes only the spring and damper. The vertical frequency responses of the active and passive systems are compared in FIG. 2. The gain of the passive suspension system is shown by the solid line curve, while the gain of the active suspension system is depicted by the dashed line curve in FIG. 2. An active suspension improves ride by lowering the natural frequency of the body and increasing body damping. The difference between the two gain curves is a measure of improved ride performance. A lower gain means better ride since the body sees less acceleration.

There are several practical problems encountered in tuning an active suspension. First, the vehicle parameters are not easily determined and may change from vehicle to vehicle, over time, or with road conditions. Second, minimizing body acceleration must be traded off with wheel travel and controller power. Lastly, the optimum dynamic characteristics which are needed to minimize vertical acceleration change with the shape of the road frequency spectrum (even if vehicle parameters remain constant). The invention to be described is an adaptive controller which automatically compensates for such variations and determines the optimal gains for the active suspension system.

The first step in implementing the adaptive control according to the present invention is the selection of a fixed gain control structure which provides the desired level of performance based on established vehicle parameters and nominal road inputs. For the physical model shown in FIG. 1, a preferred fixed-gain control structure is illustrated in FIG. 3 and includes both body acceleration feedback a and wheel displacement (strut length position error) feedback e to produce an output command value u which determines hydraulic fluid flow into (or out of) the actuator chamber.

Figure 3:
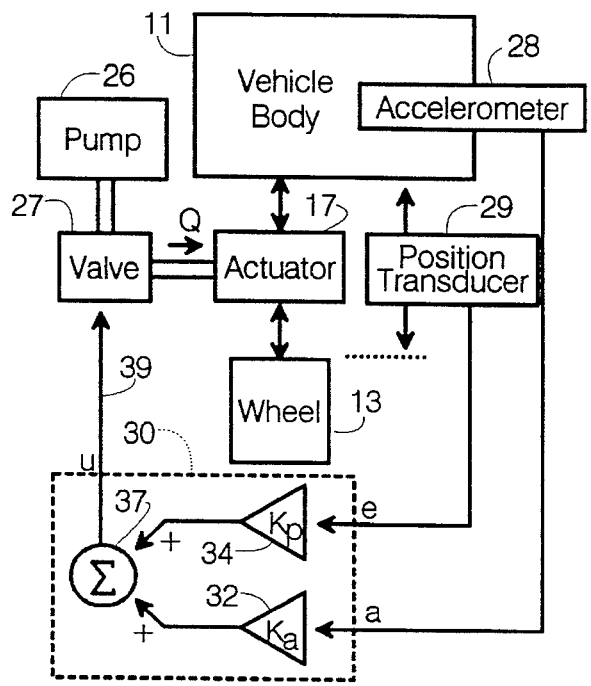
FIG. 3 is a schematic diagram of a known form of closed-loop suspension control system whose performance may be improved by utilizing the principles of the present invention.

As seen in FIG. 3, the fluid flow Q is supplied to the actuator 17 by the combination of a pump 26 and a control valve 27 which regulates the flow Q in accordance with a numerical command value u. An accelerometer 28 provides the body acceleration signal a and a position transducer 29 provides the strut length position error signal e. The acceleration value a is multiplied within a controller 30 by a first gain parameter $K_a$ at 32 and the position error value e is multiplied by a second gain parameter $K_p$ at 34. The outputs from the gain multipliers 32 and 34 are combined at a summing node 37 to form the flow command value u which is supplied to the control valve 27 via lead 39.

Since actuator force is a function of fluid volume (the integral of the fluid flow Q), the actuator 17 acts as an integrator. Acceleration feedback acts like a sky-hook damper and strut error feedback provides integral control of ride height as described, for example, in the paper "Investigation of Adaptive Control Approaches for Vehicle Active Suspensions" by W. Sunwoo and K. C. Check, *American Control Conference*, pp. 1542–1548 (1991).

Figure 2:
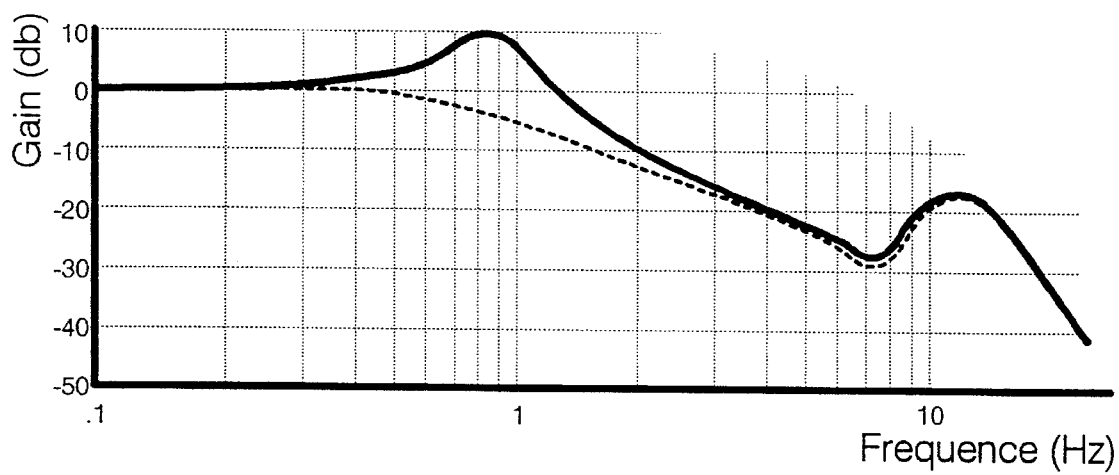
FIG. 2 is a graph which plots the gain of a conventional passive suspension system in comparison to the improved gain characteristics realizable with an active suspension system of the type contemplated by the invention.

Fixed values of the feedback gains $K_a$ and $K_p$ are then selected so that the control system shown in FIG. 3 provides adequate performance as illustrated in FIG. 2. These gains are typically selected during system development by "hand tuning" using both subjective and objective tests. Thereafter, the present invention provides a mechanism for adaptively tuning these gains to minimize a performance cost function using a pseudogradient adaptive approach with slow adaptation. U.S. patent application Ser. No. 07/720,102 noted above describes a similar adaptive control approach applied to adaptively vary the feedback gains in a vehicle speed controller.

The present invention provides a method for adaptively tuning a closed-loop suspension system of the type which generates control signal u in response to the two variable signals a and e, the value of the control signal u being functionally related to the values of said two variable signals and the value of the two tunable gain parameters, $K_a$ and $K_p$. The method of adaptively tuning the gain parameters comprises the following steps:

First, suitable initial values for the two tunable gain parameters are selected to establish a predetermined desired relationship between the values of the two variable input signals a and e, as specified by a cost function, to be discussed.

Thereafter, the rates at which the values of said two variable signals change in response to a small deviation in each tunable parameter from its selected initial value are determined. These rates of change are here termed "pseudo-sensitivities" since they are modeled approximations of the actual sensitivities.

The pseudo-sensitivities are then combined in accordance with weighting coefficients to determine the value of the incremental change in the value of the tunable parameter which is required to maintain said predetermined desired relationship as defined by the cost function as system operation conditions vary. The tunable parameters in the control system are then modified by the amount of the incremental change.

The foregoing steps are continuously repeated throughout the continuing operation of said closed-loop control system to maintain the desired operating characteristics of the system as expressed by the cost function.

The present invention employs "sensitivity filters" for determining the rate of change at which system outputs vary with respect to changes in the values of control gains. One approach to implementing such sensitivity filters is the variable components method described in *Introduction to System Sensitivity Theory* by P. M. Frank, Academic Press: New York (1978). Importantly, the sensitivity values produced by the sensitivity filters need not be exact. Since exact sensitivity values depend on both the values of the optimum feedback gains and correctly determined vehicle parameters, if both of these were known there would be little need for adaptive control. As described by D. S. Rhode in *Sensitivity Methods and Slow Adaption*, Ph.D. Thesis, University of Illinois at Urbana-Champaign (1990), adaptive control methods using inexact "pseudosensitivities" perform with stability provided that the "pseudogradient" control algorithm adheres to minimum requirements for convergence.

The suspension control system according to the present invention adaptively varies the feedback gain values from their predetermined initial values by altering these gain values by incremental amounts determined by the pseudosensitivity values. These values are given a weighted importance in accordance with a performance cost function which specifies the desired dynamic characteristics of the suspension system. The cost function resolves the trade-offs which must be made between minimizing body acceleration a, the strut length error e, and the magnitude of the control input u. Other suspension system architectures may employ additional or different terms, but the cost function below may be taken as illustrative:

$$J(P) = \int_0^\infty \beta_a a^2 + \beta_e e^2 + \beta_u u^2 \, dt \qquad (1)$$

where a=body (sprung mass) vertical acceleration;

e=strut length error (position error);

u=commanded actuator flow;

$\beta_x$=weighting factors to determine the relative importance of a, e and u; and $$P = \begin{vmatrix} K_a \\ K_p \end{vmatrix} \qquad (2)$$

The control feedback gains $K_a$ and $K_p$ are adaptively varied by incremental amounts calculated to minimize the cost function J(P), thus adapting the control system to achieve desired dynamic characteristics under changing road conditions, performance variations from vehicle to vehicle, and changes in the performance of vehicle's suspension system over time.

The relative values of the weighting factors $\beta_x$ are selected by the designer to best achieve the handling characteristics desired. Selecting a relatively larger value of $\beta_a$ reduces the amount of body acceleration for a softer ride at the cost of increased "rattlespace" and a larger actuator power for better ride. Increasing $\beta_e$ reduces wheel bounce for better handling at the price of a stiffer ride and increased actuator power.

After the weighting factors are chosen, fixed control feedback gains $K_a$ and $K_p$ may be selected which minimize the cost function J(P) for nominal operating conditions. However, these fixed gains do not take into account variations from vehicle to vehicle, changing vehicle dynamics over time, or changing road surface conditions. As contemplated by the invention, the feedback gains $K_a$ and $K_p$ are adaptively varied at a relatively slow rate to compensate for changing vehicle and driving conditions to better achieve the desired performance characteristics represented by minimizing the cost function.

This adaptation is preferably achieved by executing an adaptive algorithm implemented by a microcontroller operating under stored program control. The adaptive method used is generally depicted in the flowchart of FIG. 4 which illustrates the implementation as a parameter update routine, seen enclosed within the dotted-line 44 in FIG. 4, which is executed as part of the normal closed-loop control subroutine for generating the output flow control commands.

Figure 4:
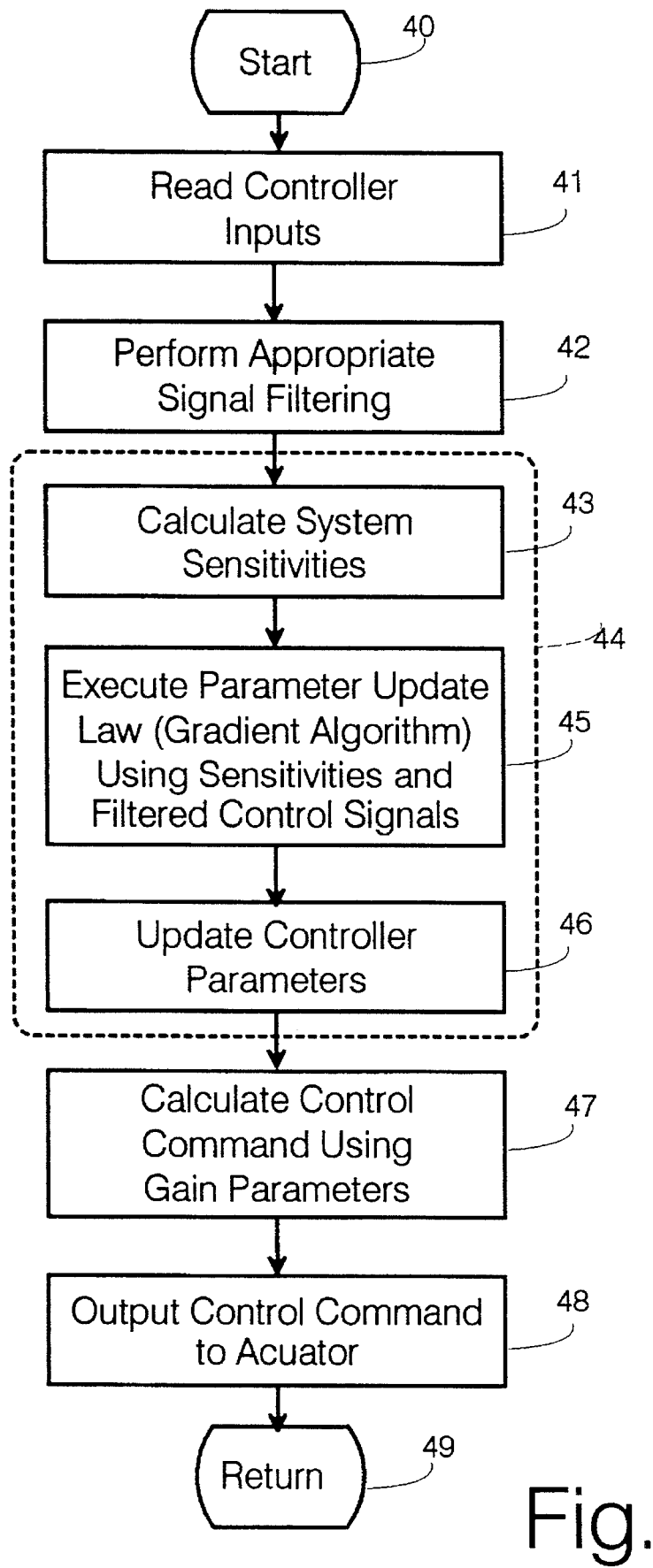
FIG. 4 is a flowchart which depicts the overall computational routine contemplated by the invention for controlling the active suspension system actuators.

The overall control subroutine is entered at 40 as seen in FIG. 4 and begins by reading the accelerometer and position sensor to provide controller inputs at 41. The sensor signals read at step 41 are filtered at step 42 to remove unwanted frequency components and the results are processed by the adaptive routine 44 and the remainder of the control routine. As illustrated by FIG. 3, the input values which are available for use in the adaptive routine 44 include:

(1) the value $\underline{a}$ which is obtained from accelerometer 28 which senses the amount of vertical acceleration being experienced by the vehicle mass (seen at 11 in FIG. 1); and (2) the value $\underline{e}$ from the position transducer 29 which indicates the strut position error as the wheel mass 13 is deflected from its equilibrium position.

The control routine shown in FIG. 4 produces a third quantity which is calculated at step 47, supplied to the actuator 17 at step 48, and taken into account by the adaptive gain control mechanism in the adaptive routine 44. This third quantity is:

(3) the value $\underline{u}$, the actuator fluid flow command quantity, which determines (after integration by the actuator 17) the amount of force applied by the actuator between the vehicle body and the unsprung wheel mass. The value $\underline{u}$ is necessarily limited, in any practical system, by the amount of power which can delivered to the suspension system by the available pump and actuator mechanisms.

The adaptive routine 44 may be performed at a slower rate than the remainder of the control routine shown in FIG. 4. The actuator control value $\underline{u}$ must be updated at a rate high enough to control the sprung mass acceleration frequency components (up to about 10 hertz, above which the system response is dominated by the characteristics of the passive spring and damper as seen from FIG. 2). However, the feedback gains should only adapt at a significantly slower rate. The rate of gain adaptation is controlled by a predetermined constant $\epsilon$ which, as discussed in more detail below, operates a sizing coefficient to limit the magnitude of each incremental adjustment to the system's control gains. The computational burden placed on the control microprocessor may be lowered by reducing the frequency at which the adaptive algorithm 44 is performed while correspondingly increasing $\epsilon$ to yield the same total adaptive gain change.

The incremental amount by which each control variable is adaptively varied by the updating routine 44 is given by the following expressions which define the gradient algorithm used:

$$\frac{dK_a}{dt} = \epsilon \left( \beta_{a,a} a \frac{\delta a}{\delta K_a} + \beta_{e,a} e \frac{\delta e}{\delta K_a} + \beta_{u,a} u \frac{\delta u}{\delta K_a} \right) \quad (3)$$

$$\frac{dK_p}{dt} = \epsilon \left( \beta_{a,p} a \frac{\delta a}{\delta K_p} + \beta_{e,p} e \frac{\delta e}{\delta K_p} + \beta_{u,p} u \frac{\delta u}{\delta K_p} \right) \quad (4)$$

In the gradient algorithm definitions above, the coefficient $\epsilon$ is kept small to insure "slow" adaptation as noted above. The partial derivatives of system outputs $\underline{a}$, $\underline{e}$ and $\underline{u}$ with respect to the system parameters (feedback gains $K_a$ and $K_p$) are the system "sensitivities" which are calculated in real time by using sensitivity filters which will be described in more detail later.

Figure 5:
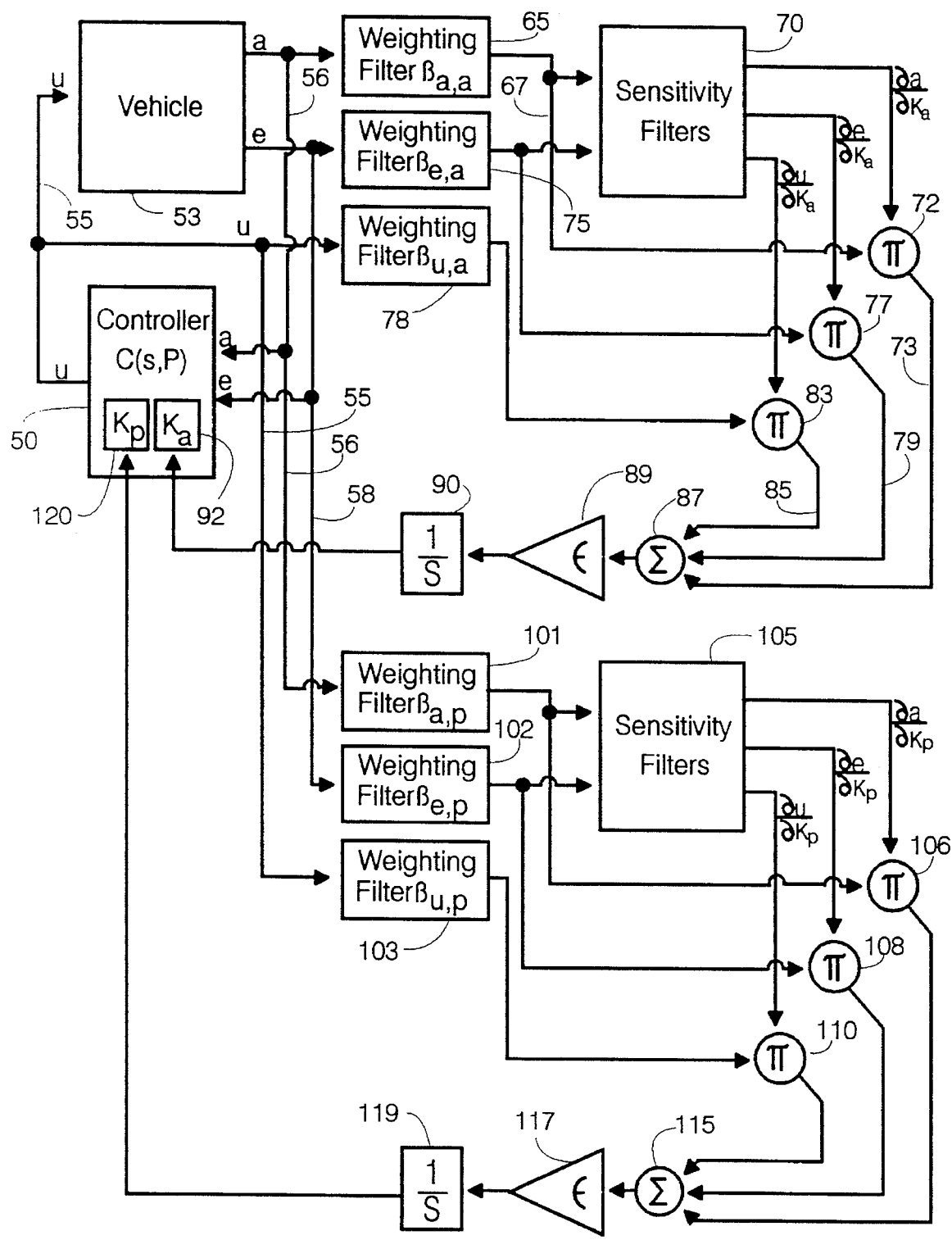
FIG. 5 is a block signal flow diagram of the adaptive suspension system contemplated by the invention.

FIG. 5 of the drawings is a signal flow diagram which depicts the operation of the preferred adaptive suspension system according to the invention. As seen in FIG. 5, an adaptive closed-loop controller 50, which is typically implemented by a programmed microcontroller to perform the functions illustrated in FIG. 3, is connected to control a physical suspension system indicated by the block 53 by applying control command values $\underline{u}$ via lead 55 to a suspension system actuator (not shown) in response to sensed variations in the sprung mass acceleration value $\underline{a}$ obtained from the physical system 53 and supplied via a lead 56, and in response to the stroke position error $\underline{e}$ quantity which is also obtained from the physical system 53 and supplied on lead 58. The acceleration value $\underline{a}$ is multiplied by the weighting factor $\beta_{a,a}$ in a weighting filter 65 and the resulting product signal is applied via line 67 to a sensitivity filter at 70 and to a multiplier 72, the second input of which is connected to receive the partial derivatives $\delta a/\delta K_a$ from one of the sensitivity filters 70. The output lead 73 from multiplier 72 accordingly receives the quantity $\beta_{a,a}(\delta a/\delta K_a)$. In like fashion, a weighting filter 75 and a summing node 77 are connected to form the quantity $\beta_{e,a}(\delta e/\delta K_a)$ on lead 79. A weighting filter 78 and a summing node 83 are similarly connected to form the quantity $\beta_{u,a}(\delta u/\delta K_a)$ on lead 85. The quantities on leads 73, 79 and 85 are added together at node 87 and the summation is multiplied times the adaptation rate coefficient $\epsilon$ at 89 to form the quantity $dK_a/dt$ as represented by equation (3) above. The gain coefficient $K_a$ used within the controller 50 may accordingly be stored in a register 92 whose contents are incremented or decremented by an amount equal to the calculated pseudogradient $dK_a/dt$ which adaptively varies the gain by an incremental amount which will minimize the cost relationship given by equation (1). The adaptive accumulation of these incremental changes is represented by the integration unit seen at 90 in FIG. 5.

An equivalent arrangement is employed to form the quantity $dK_p/dt$ as seen in the lower portion of FIG. 5. This arrangement comprises the weighting filters 101, 102 and 103, together with the sensitivity filters 105 and the multipliers 106, 108 and 110, to form the addends which are combined at node 115 and multiplied by $\epsilon$ at 117. The resulting quantity $dK_p/dt$ at the output of multiplier 117 is used to increment or decrement the gain $K_p$, as represented by the integration unit 119, to form the adaptive gain value stored in the register 120 for use by the controller 50.

Figure 6:
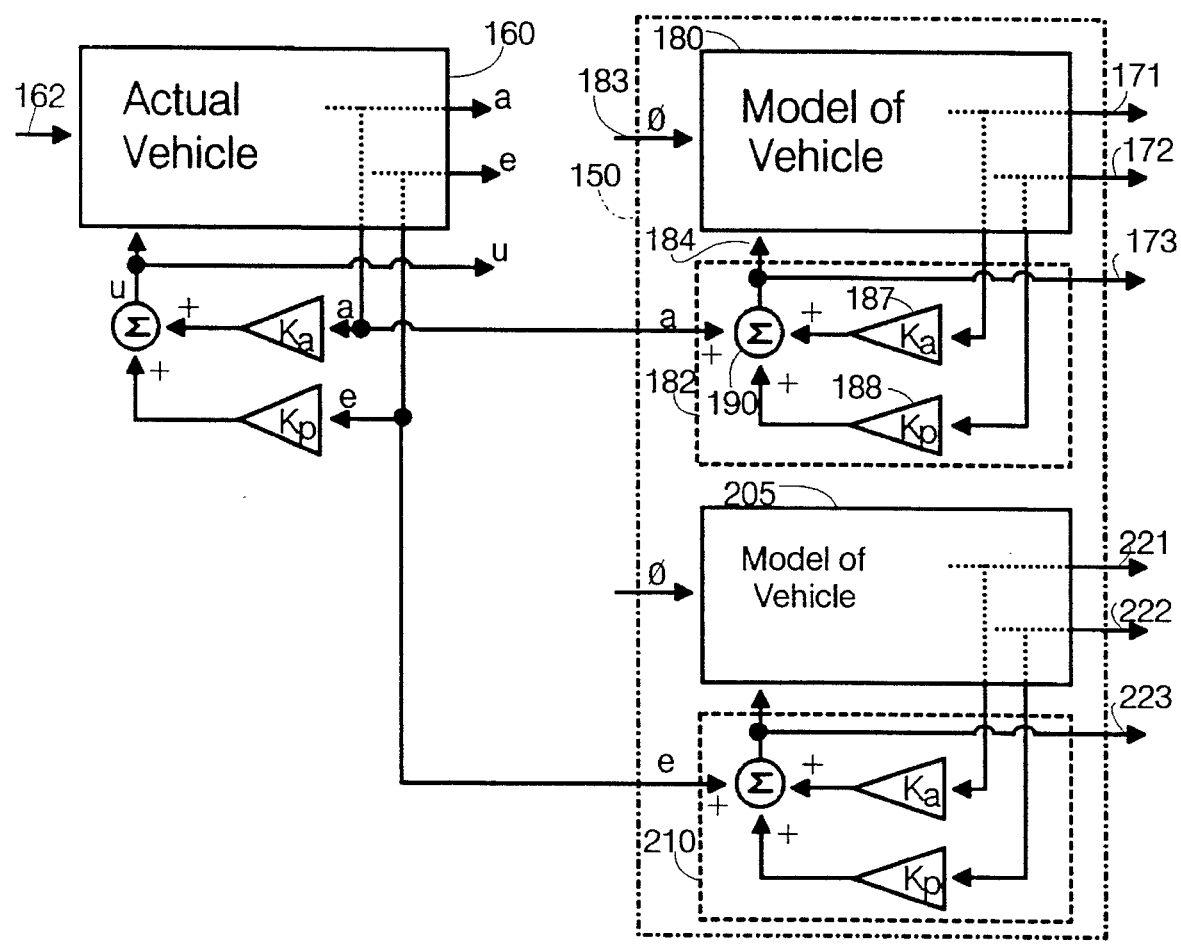
FIG. 6 is a block signal flow diagram which depicts the details of sensitivity filters which may be used to implement the invention.

The sensitivity filters 70 and 105 seen in FIG. 5 may be implemented using the variable components method as shown within the dashed-line rectangle 150 in FIG. 6. The sensitivity filters 150 are connected to receive and respond to the acceleration value $\underline{a}$ and the position error $\underline{e}$ from the physical suspension system of the actual vehicle represented at 160 in FIG. 6.

The quantities $\delta a/\delta K_a$, $\delta e/\delta K_a$ and $\delta u/\delta K_a$ are generated on leads 171, 172 and 173 respectively by the combination of a vehicle model 180 and a fixed gain controller 182. While the actual vehicle indicated at 160 in FIG. 6 responds to an actual road disturbance input as indicated at 162, the vehicle model 180 responds to a zero road disturbance input at 183 and to a modeled control command from the controller 182 via conductor 184. The controller 182 includes fixed gain feedback paths 187 and 188 which have nominal gain values chosen to provide an appropriate dynamic response under predetermined nominal conditions. The actual vehicle acceleration value $\underline{a}$ is applied to a summing node 190 in the fixed gain controller 182, along with the two feedback signals, such that the desired sensitivities (the partial derivative of the system variables with respect to the gain value $K_a$) are obtained as shown.

A similar arrangement seen at the bottom of FIG. 6 uses a second vehicle model 205 and a second fixed gain controller 210 to generate the quantities $\delta a/\delta K_p$, $\delta e/\delta K_p$ and $\delta u/\delta K_p$ on leads 221, 222 and 223 respectively, the only difference being that the summing node within the fixed gain controller 210 receives the position error value $\underline{e}$ rather than the body acceleration value $\underline{a}$.

Figure 7A:
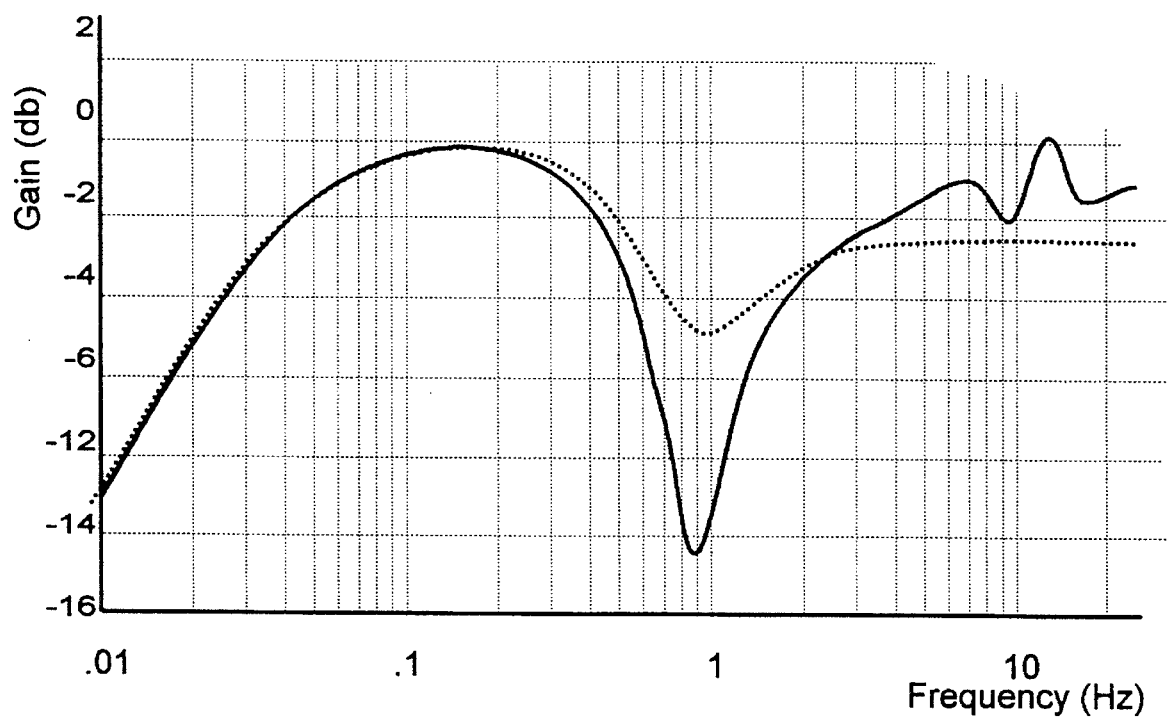
FIGS. 7(a) and 7(b) are graphs which depict typical gain and phase-shift characteristics of the sensitivity filters used to implement the invention.
Figure 7B:
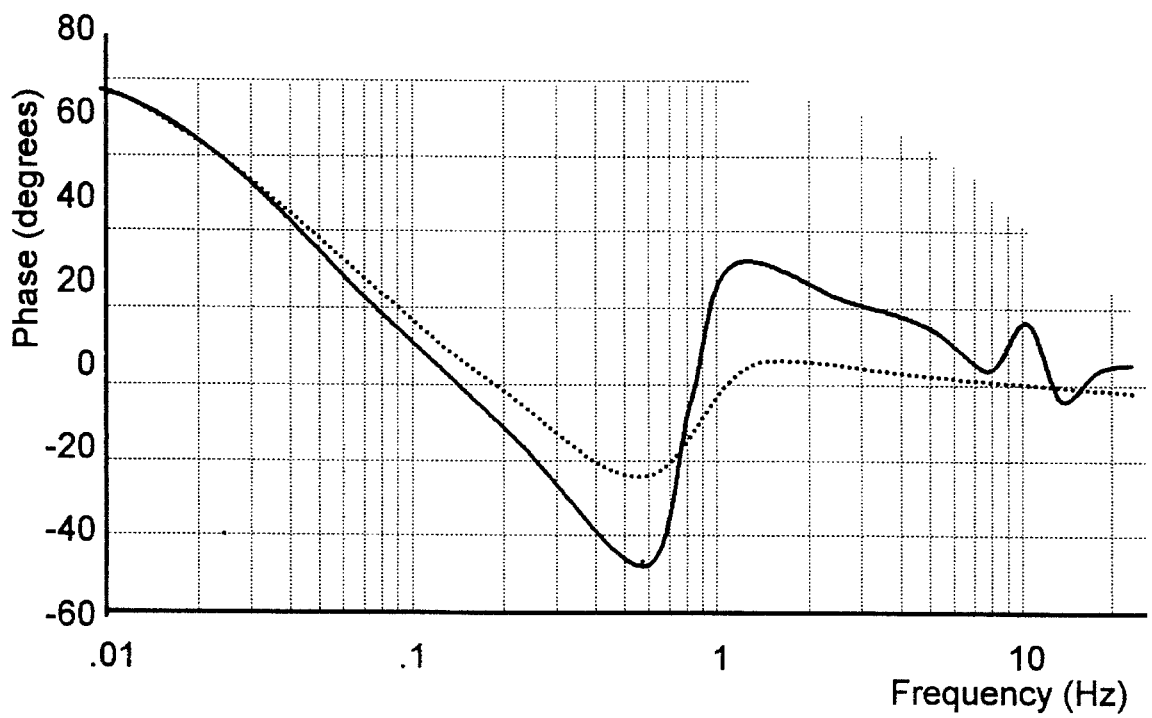

Besides a standard persistency of excitation requirement, the Bode phase characteristics of the pseudosensitivities must be within 90° of the actual sensitivities in the frequency range of interest. FIG. 7 shows the frequency response for one of the pseudosensitivity filters ($\delta u/\delta K_a$ seen as the dotted line curve) as well as the response of the corresponding exact sensitivity filter for an active suspension model. As seen in FIG. 7, the phase of the pseudosensitivity value is within 90° of the actual value over the complete range of frequencies. The adaptive routine has been shown to be stable and to adaptively converge the values of the feedback gains toward values which minimize the predetermined cost function as desired.

It is to be understood that the foregoing description of a preferred embodiment of the invention is merely illustrative. Numerous modifications may be made to the arrangement shown without departing from the true spirit and scope of the invention.

What is claimed is:

1. An active vehicle suspension system comprising, in combination, a vehicle body, a wheel, a mechanical suspension system for mounting said wheel for movement with respect to said body, said suspension system including an active suspension actuator coupled to a source of motive power for applying forces between said wheel and said body in response to a suspension control signal, and a closed-loop feedback controller for generating said suspension control signal to substantially minimize the cost value J(P) in accordance with the following equation:

$$J(P) = \int_0^\infty \beta_a a^2 + \beta_e e^2 + \beta_u u^2 \, dt$$

where $\underline{a}$ is the vertical acceleration experienced by said body;

$\underline{e}$ is the vertical position displacement experienced by said wheel;

$\underline{u}$ is the rate of change of force caused by said suspension control signal;

$\beta_x$ are weighting factors which determine the relative importance of $\underline{a}$, $\underline{e}$ and $\underline{u}$; and $K_a$ and $K_p$ are the closed-loop feedback gain values which govern the functional relationship between the suspension control signal and values $\underline{a}$ and $\underline{e}$; and means for adaptively varying said feedback control gains $K_a$ and $K_p$ by incremental amounts given by the relationships:

$$\frac{dK_a}{dt} = \epsilon \left( \beta_{a,a} a \frac{\delta a}{\delta K_a} + \beta_{e,a} e \frac{\delta e}{\delta K_a} + \beta_{u,a} u \frac{\delta u}{\delta K_a} \right)$$

$$\frac{dK_p}{dt} = \epsilon \left( \beta_{a,p} a \frac{\delta a}{\delta K_p} + \beta_{e,p} e \frac{\delta e}{\delta K_p} + \beta_{u,p} u \frac{\delta u}{\delta K_p} \right)$$

where $\epsilon$ is a coefficient which determines the rate at which said feedback control gains are altered, and the weighting coefficients $\beta_{x,x}$ are selected such that the control gains produce said suspension control signal which minimizes said cost value.

2. An active vehicle suspension system as set forth in claim 1 wherein said feedback controller generates said suspension control signal at a first rate and said means for adaptively varying said feedback control gains operates at a second rate, slower than said first rate.

* * * * *